J. D. JOHNSON.
DIFFERENTIAL MECHANISM.
APPLICATION FILED SEPT. 22, 1920.

1,425,970.

Patented Aug. 15, 1922.
5 SHEETS—SHEET 3.

Inventor
John D. Johnson
Attorney
Frank Warren

J. D. JOHNSON.
DIFFERENTIAL MECHANISM.
APPLICATION FILED SEPT. 22, 1920.

1,425,970.

Patented Aug. 15, 1922.

Inventor
John D. Johnson
Attorney
Frank Warren.

UNITED STATES PATENT OFFICE.

JOHN D. JOHNSON, OF SEATTLE, WASHINGTON, ASSIGNOR TO JOHNSON POWER TRANSMISSION COMPANY, OF SEATTLE, WASHINGTON.

DIFFERENTIAL MECHANISM.

1,425,970. Specification of Letters Patent. Patented Aug. 15, 1922.

Application filed September 22, 1920. Serial No. 411,879.

*To all whom it may concern:*

Be it known that I, JOHN D. JOHNSON, a citizen of the United States, residing at Seattle, in the county of King and State of Washington, have invented a certain new and useful Improvement in Differential Mechanism, of which the following is a specification.

My invention relates to improvements in differential mechanism for motor vehicles and more particularly to differential mechanisms of the locking type and is an improvement on the differential mechanism disclosed and claimed in a prior patent issued to me September 17, 1918, No. 1,279,118; and the object of my invention is to provide a locking differential mechanism of the type wherein the power from the driving or propeller shaft of the vehicle is transmitted to the driven shafts of the said vehicle which are disposed substantially perpendicular to the said driving shaft to rotate the said driven shafts at a uniform rate of speed or to permit the same to rotate at variable rates of speed under any and all conditions.

Another object is to provide a locking differential mechanism for motor vehicles embodying novel features which reside in the form of construction and disposition of the several elements comprising the differential mechanism, which is adapted to engage and disengage the driven axles of the driving or traction wheels of the vehicle, as distinguished from the structure disclosed and claimed in the prior patent hereinbefore referred to.

A further object is to provide a locking differential mechanism for motor vehicles embodying novel frictional retarding means adapted to be functionally associated with novel controlling means whereby the action of the clutching or gripping elements of the mechanism are positively controlled at all times and under any or all conditions.

A further object is to provide a locking differential mechanism for motor vehicles embodying novel means whereby the action of one of the rear traction wheels of the vehicle is adapted to automatically control the action of the other rear traction wheel of the said vehicle.

A still further object is to provide a locking differential mechanism embodying simplicity, durability, strength and economy in construction, that is positive and efficient in operation and that will not readily get out of order.

With the above and other objects in view which will appear as the description proceeds, my invention resides in the novel construction, combination, adaptation and arrangement of parts hereinafter described and claimed.

I accomplish these objects by the structures illustrated in the accompanying drawings, wherein:—

Referring to the drawings throughout which like reference numerals indicate like parts, the numerals 21 and 22 indicate the halves of a differential housing of a form similar to that commonly used for containing and supporting the differential mechanism of a motor vehicle. The said halves being provided with annular flanges 23 on their inner abutting ends which flanges 23 are adapted to be fixedly secured together by bolts 24 to form a symmetrical hollow housing of the shape illustrated in Figure 1.

The halves 21 and 22 of the differential housing are provided on their outer ends with integrally formed axially aligned axle or shaft housings 25 and 26, respectively, within which are concentrically disposed the rear axles or shafts 27 and 28, respectively, which shafts extend outwardly to and are connected in any well known manner with the driving or traction wheels of the motor vehicle not shown.

Concentrically disposed within the halves 21 and 22 of the differential housing adjacent the inner ends of the axle housings 25 and 26 and in axial alignment therewith are integrally formed journal bearings 29 and 30 respectively.

The numerals 31 and 32 indicate the halves of a cylindrical differential case adapted to substantially enclose my differential mechanism, which halves 31 and 32 are provided with outwardly projecting integral hub portions 33 and 34 respectively. The hub portion 33 of the half 31 being journaled for rotation in the bearing 29 and the hub portion 34 of the half 32 being similarly journaled in the bearing 30. The halves 31 and 32 are adapted to be fixedly secured together by bolts 35 as shown more clearly in Figure 1 to thus form a symmetrical hollow case of the shape substantially as illustrated in the accompanying drawings.

The half 31 of the differential case is provided on its outer end with a peripheral annular flange 36, the latter having an annular bevel or master gear 37 fixedly secured thereto on the inner side thereof by rivets 38.

Figures 1, 2, 3, 4, 5:
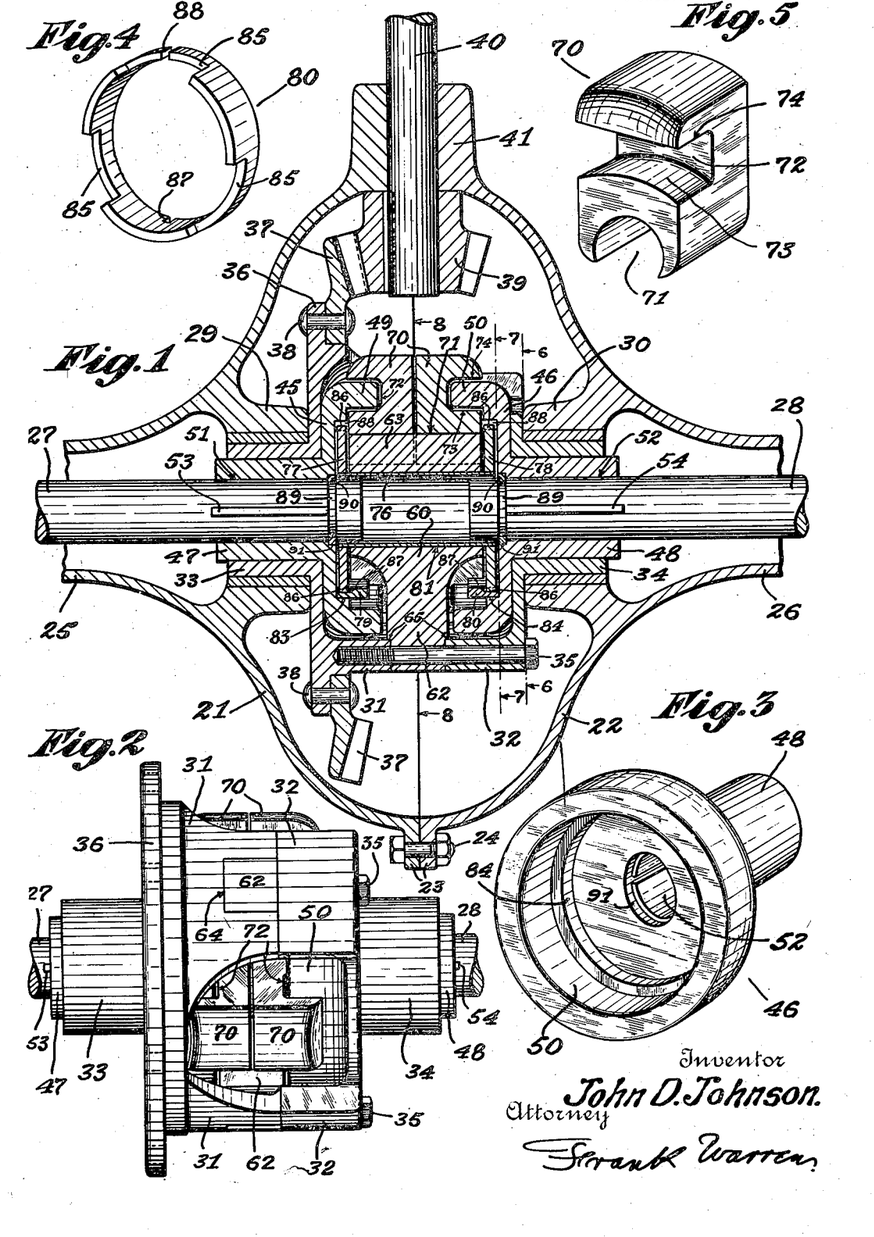
Figure 1 is a view in horizontal medial section of a locking differential mechanism embodying the features of my invention.
Figure 2 is a view in side elevation of the same with the master bevel gear removed.
Figure 3 is a view in perspective of a coupler or driven member adapted for use with my mechanism.
Figure 4 is a view in perspective of a frictional retarding spring ring adapted for use with my invention.
Figure 5 is a view in perspective of a gripping or locking dog adapted for use with my invention.

The bevel gear 37 normally meshes with a driving pinion 39 fixedly mounted on the rear end of a driving or propelling shaft 40 which rear end extends or projects into the differential housing through a journal bearing 41 integrally formed on the forward side of the said housing as more clearly shown in Figure 1.

Axially and oppositely disposed in spaced apart relation within the differential case and adapted for rotation with or for independent rotation with respect to the said differential case are coupler or driven members 45 and 46, which members are provided with outwardly projecting integrally formed hub portions 47 and 48 and with inwardly projecting integrally formed annular peripheral flanges 49 and 50 as more clearly illustrated in Figure 1.

The hub portions 47 and 48 of the coupler members 45 and 46 are journaled for rotation within the hub portions 33 and 34 of the halves 31 and 32 of the differential case as shown in Figure 1.

The hub portions 47 and 48 are provided with axially disposed bores 51 and 52 which bores are adapted to receive the inner ends of the axles or shafts 27 and 28 which inner ends of the said axles are adapted to be fixedly secured to the said hub portions 47 and 48 by keys 53 and 54.

Figures 6, 7, 8, 9, 10:
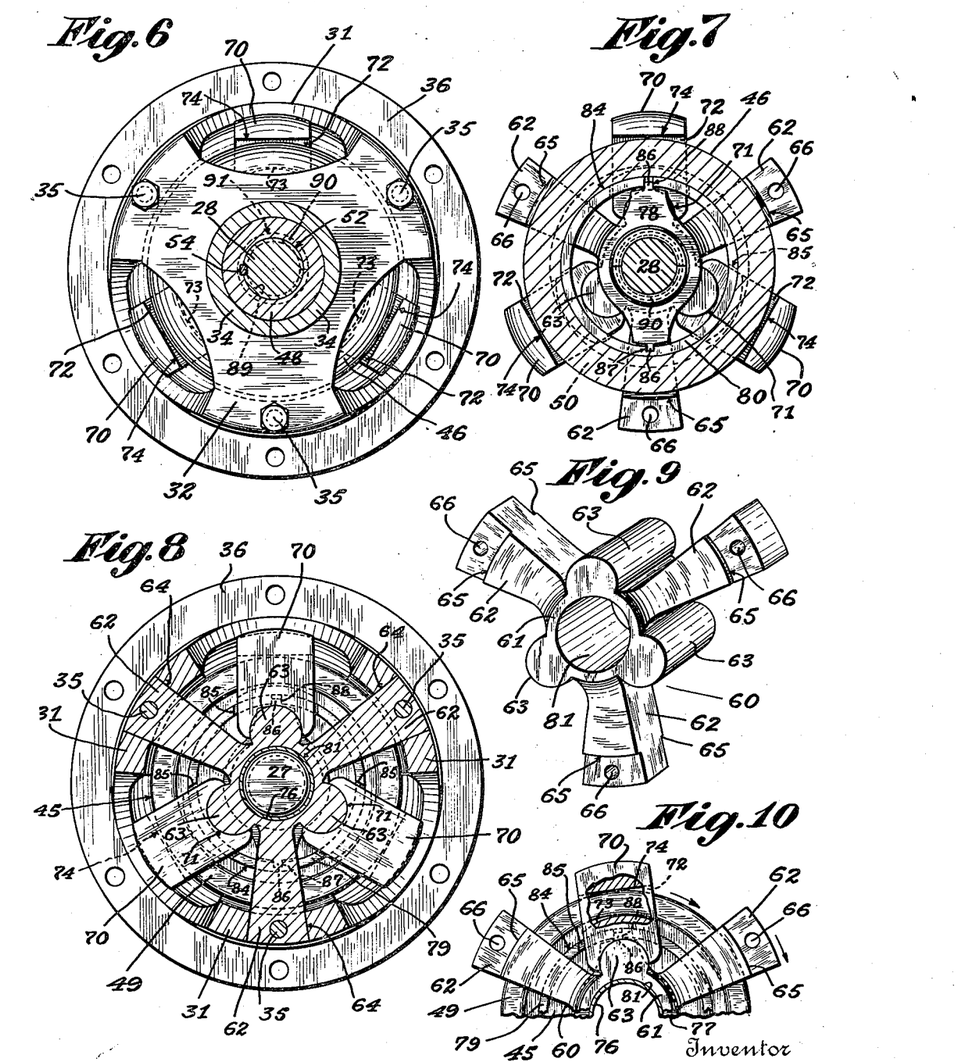
Figure 6 is a view in vertical transverse section taken on a broken line 6—6 of Figure 1 with the master bevel gear removed and illustrating the mechanism in an inoperative or neutral position.
Figure 7 is a similar view taken on a broken line 7—7 of Figure 1 illustrating the mechanism detached from the differential case.
Figure 8 is also a similar view taken on a broken line 8—8 of Figure 1.
Figure 9 is a view in perspective of the spider or driving member adapted for use with my mechanism.
Figure 10 is a detached fragmentary view in vertical transverse section illustrating the clutching or locking elements of my mechanism in an operative position, parts being broken away.

Concentrically disposed within the differential case is a spider or driving member 60 comprising a central portion 61, a plurality of integral radial arms 62, and a plurality of outwardly projecting integrally formed substantially semi-cylindrical bearing surfaces 63 which are longitudinally and radially disposed on and with respect to the central portion 61 as clearly shown in Figure 9.

The outer ends of the radial arms 62 of the spider 60 are adapted to seat in recesses or cutouts 64 formed in the inner edge portion of the half 31 of the differential case as shown in Figures 2 and 8.

To retain and maintain the spider 60 in concentric alignment within the differential case I have provided the radial arms 62 adjacent their outer ends with shoulders 65 which shoulders are adapted to abut the inner wall of the said differential case as shown in Figure 1. The bolts 35 which secure the halves 31 and 32 of the differential case are also adapted to pass through suitable apertures 66 formed in the outer ends of the radial arms 62 when the spider 60 is disposed in operative position within the differential case as shown more clearly in Figures 1 and 8, to thus rigidly secure the spider 60 in operative position within the differential case.

Clutching or gripping dogs 70 of the form illustrated in Figure 5 are provided to establish a driving connection between the positively driven spider 60 and the coupler members 45 and 46 which are fixedly secured to the inner ends of the rear axles 27 and 28.

The gripping dogs 70 are recessed or grooved on their inner ends as at 71 to adapt them to fit over or journal on the semi-cylindrical bearing surfaces 63 of the spider 60 as shown in Figures 1, 7, 8 and 10 in such a manner that the lower extremities of the dogs are normally below the axis of the said bearing surfaces to thereby positively retain the dogs in position against dislodgment due to centrifugal force or other causes.

The gripping dogs 70 are further provided on one of their sides thereof at a point adjacent their outer ends with transverse slots 72, the inner walls 73 of which slots are convexly curved while the outer walls 74 are in the form of plane surfaces as shown in the several views of the drawings or the said upper walls 74 may also be curved convexly if desired.

A series or plurality of the dogs 70 are provided for functional engagement with the annular peripheral flange 49 of the coupler member 45 while a second series or plurality of dogs 70 which are oppositely disposed or in back to back relation with respect to the first series or plurality are provided for functional engagement with the annular peripheral flange 50 of the coupler member 46.

The walls 73 and 74 of the slots 72 of the dogs 70 are adapted to normally fit over the flanges 49 and 50 of the coupler members 45 and 46, when the mechanism is assembled as shown in Figure 1.

It will be apparent by referring to the drawings that sufficient clearance is provided between the said walls and the said flanges when the mechanism is in a neutral or inoperative position to thus eliminate friction between the said dogs and either of the flanges 49 or 50, as for example, during the overrunning of either of the rear axles 27 or 28.

With the gripping dogs 70 thus relatively disposed on the bearing surfaces 63 and also thus relatively disposed with respect to the flanges 49 and 50, it will be apparent that a rotative movement of the spider 60, relative to either of the said flanges 49 and 50, will oscillate or swing the gripping dogs 70 out of radial alignment with respect to the axis of the spider 60, as for example, from their radial positions shown in Figures 6, 7 and 8 to the position shown in Figure 10, to thus cause the walls 73 and 74 of the slots 72 of the said dogs to grip or clutch the flanges 49 and 50, and thereby communicate rotary motion to the coupler members 45 and 46 and thence through the said members to the axles 27 and 28.

The walls 73 and 74 of the dogs 70 will securely grip the flanges 49 and 50 without marring or cutting the same thereby eliminating excessive wear on the said flanges as will be readily understood by referring to Figure 10.

In practice I have found it advisable in order to obtain the best results and the maximum efficiency for my differential mechanism to establish definite relative proportions between the radii of the convex surfaces 73 of the gripping dogs 70 and the radii of the inner faces of the annular flanges 49 and 50 of the coupler members 45 and 46, so that when the said dogs 70 engage their associated annular flanges during the operation of the mechanism, the said convex surfaces 73 will provide a slightly greater contact with the said inner faces of the said annular flanges than is provided by the plane surfaces 74 of the said dogs 70 with the outer faces of the said annular flanges, to thus positively insure that the said dogs will be operatively functioned in their proper or normal position on their associated semi-cylindrical bearings 63 at all times to thereby prevent the said dogs from a tendency to lift or becoming separated from their said bearings during the operation of the said mechanism.

In their operative position the gripping dogs 70 constitute and provide a positive locking or driving connection between the spider 60 and the coupler members 45 and 46, which, while the vehicle remains on a straight course is substantially the equivalent of having a solid rear driven shaft. Should one of the driving or traction wheels of the vehicle lose its traction for any reason, the other or opposite wheel with good traction will by virtue of the locking action of the dogs 70 extricate the vehicle and also will prevent the churning of the wheel with poor traction during the said extrication as ordinarily occurs in differential mechanisms now in use.

It will be readily apparent from the foregoing that by virtue of the aforesaid locking action of the dogs 70 that both of the traction wheels will be rotated at the same speed, thereby permitting the wheel with the poor traction assisting in so far as possible the wheel with good traction to extricate the vehicle.

In order to control the oscillating or swinging movements of the gripping dogs 70 and to cause them to engage and disengage their respective flanges at proper times, I have provided suitable controlling mechanism therefor comprising a sleeve or tubular member 76, disc members 77 and 78, and split frictional retarding rings 79 and 80.

The sleeve member 76 is adapted to be normally and concentrically disposed within an axially and longitudinally disposed bore 81 formed in the central portion 61 of the spider 60, within which bore 81 the sleeve member 76 is adapted for independent rotation with respect to the spider 60. The ends of the said sleeve when so disposed being adapted to project slightly beyond the ends of the said central portion 61 as shown in Figure 1.

Fixedly secured to one of the projecting ends of the sleeve member 76 is the disc member 77 and similarly secured to the other or opposite projecting end is the disc member 78.

The frictional retarding ring 79 is adapted to be partially disposed for independent rotary motion in an annular seat 83 formed in the coupler member 45, while, the frictional retarding ring 80 is similarly adapted to be partially disposed for independent rotary motion in an annular seat 84 formed in the coupler member 46 as shown in Figure 1.

Each of the rings 79 and 80 are provided with a plurality of spaced equi-distant radial slots or recesses 85 within which the gripping dogs 70 are adapted to be transversely disposed for operative engagement with the said rings, the said radial slots 85 being formed of sufficient length to permit of a limited independent oscillatory movement of the dogs 70 with respect to the said rings, which limited movement permits of an oscillating or swinging movement of the dogs 70 in either a forward or reverse direction to thereby allow the said dogs to grip the flanges 49 and 50 subsequent to contacting with either the end walls of the slots 85 of the said rings. The said radial slots 85 in the rings 79 and 80 also serve to retain and maintain the dogs 70 in radial spaced apart relation.

The rings 79 and 80 are adapted to be operatively connected in a suitable manner to positively insure the simultaneous action of both of the said rings to thereby prevent independent movement of one ring with respect to the other, and to so connect the said rings I have provided the outer ends of the disc members 77 and 78 with tongues 86, two of which tongues are adapted to normally seat in grooves or key ways 87 formed in the inner wall of the said rings contiguous to the outer edges thereof, the remaining two of the said tongues 86 being adapted to seat in the openings 88 formed by the splitting of the said rings, to thereby provide a mechanism which will permit one of the said rings to control the action of the other of the said rings.

To prevent axial movement of the axles 27 and 28 in an outward direction, I have provided the latter at points adjacent their inner ends with peripheral grooves 89 which are adapted to receive split rings 90 the peripheral portions of the said split rings being normally disposed in annular recesses 91 formed in the coupler members 45 and 46.

With the relative movements of the several elements of the mechanism thus controlled as hereinbefore described, it will be obvious that should power be applied to the differential case in either direction through the driving pinion 39 and the master gear 37, the spider 60 being positively connected to the said differential case, is adapted to be rotated therewith, the said spider having the dogs 70 journaled thereon will oscillate or swing the said dogs out of radial alignment with respect to its axis through the limit of the independent travel of the said dogs 70 in the slots 85 of the retarding rings 79 and 80 thereby causing the dogs 70 to grip their associated flanges 49 and 50 on the coupler members 45 and 46, to thus rotate or drive their associated axles 27 and 28. In this position all of the elements comprising the differential mechanism rotate in the same direction and at the same speed.

When the vehicle departs from a straight course thereby causing the axle of the outside traction wheel to revolve faster in the same direction than the axle of the inside traction wheel which continues to revolve at the same speed as the differential case, the dogs 70 associated with the axle of the outside wheel will be disengaged from their associated flange, and moved to a substantially neutral position by virtue of the overrunning of their associated coupler member and their frictional engagement therewith, to thus permit the said flange to slip and rotate freely through the slots 72 of the said dogs. The retarding ring associated with the dogs 70 of the outside axle, by reason of its being positively connected with the retarding ring of the inside axle, the said first named retarding ring slips within its associated coupler member, but, continues to rotate at the same speed as the differential case while the said associated coupling member revolves at the speed of the outside wheel during the turning movement of the vehicle.

It will be apparent that the retarding ring associated with the outside axle thus serves to maintain its associated dogs 70 in a disengaged position during the said turning movement thereby preventing the said dogs from passing over their dead center, by virtue of the fact that the said retarding ring continues to rotate at the same speed as the inside axle and the differential case.

In practice and after exhaustive experimentation I have found that a locking differential mechanism constructed in accordance with my invention is readily adaptable for operation in either a forward or reverse direction with uniform efficiency, there being no friction or retarding stress on the outside wheel during the overrunning action of my mechanism, which occurs when the vehicle leaves a straight course, as the flange of the outside wheel runs perfectly free in the slots of its associated dogs.

In the modification shown in Figures 11 to 14 inclusive, I have varied the form of the dog controlling mechanism of my differential so that the tubular member 76 with its associated discs 77 and 78, and the keyways 87 formed in the split retarding rings 79 and 80 may be done away with.

Figures 11, 12, 13, 14:
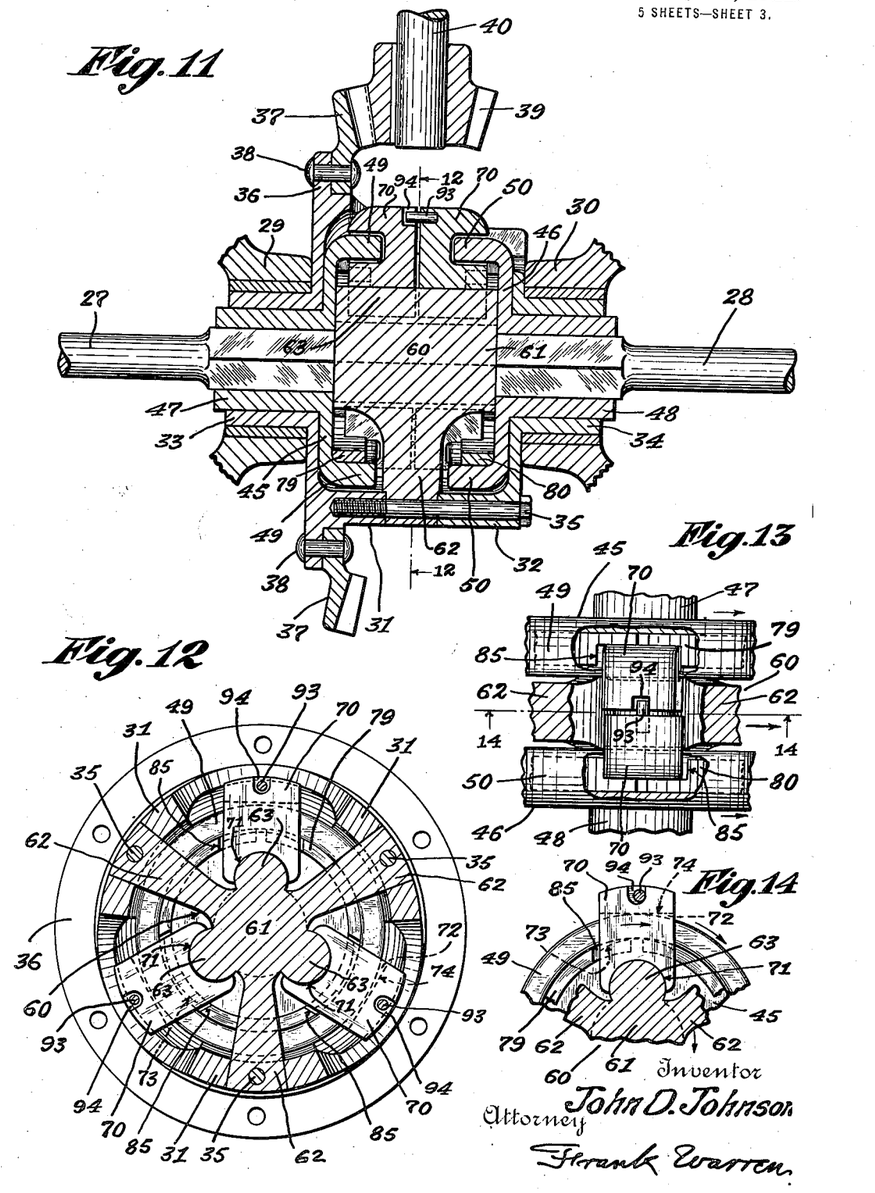
Figure 11 is a view in horizontal medial section of a modified form of my locking differential mechanism.
Figure 12 is a view in vertical transverse section taken on a broken line 12—12 of Figure 11 with the master bevel gear removed and illustrating the mechanism in an inoperative or neutral position.
Figure 13 is a detached fragmentary view in top plan illustrating the locking elements of my mechanism in an operative or compensating position, parts being broken away.
Figure 14 is a view in vertical transverse section taken on a broken line 14—14 of Figure 13.

The central portion 61 of the spider 60 in the modification is formed solid as shown in Figures 11, 12 and 14, but otherwise the construction of the spider 60 is identical to that described for the form shown in Figures 1 to 10.

The split retarding rings 79 and 80 are adapted to be disposed within the coupler members 45 and 46, the peripheral surfaces of the said rings being adapted to frictionally engage the inner walls of the flanges 49 and 50 of the said coupler members when so disposed as shown more clearly in Figure 11.

The dogs 70 are mounted for oscillatory movement on the spider 60 to engage and disengage their respective flanges 49 and 50, and are also adapted to be disposed in the slots 85 of the retarding rings 79 and 80 substantially in the manner described for the form shown in Figures 1 to 10.

To control the oscillating or swinging movements of the gripping dogs 70 in the modified form, to thus cause the said dogs to engage and disengage their respective flanges at proper times, I have provided the series of dogs 70, associated with the flange 50 of the coupler member 46, with pins 93, which pins 93 are adapted to be fixedly secured in and medially disposed on the inner sides of the said dogs adjacent their upper and outer ends, the outer ends of the said pins 93 being adapted to project outwardly from the inner sides of the said dogs, which outer ends are adapted to be normally disposed in medially arranged recesses 94 formed in the inner sides adjacent the upper and outer ends of the series of dogs 70 associated with the flange 49 of the coupler member 45 as shown more clearly in Figures 11 to 14.

The recesses 94 are of sufficient size to permit of a limited independent oscillatory movement in a forward or reverse direction of the series of dogs 70 associated with the flange 50 with respect to the series of dogs 70 associated with the flange 49, and also a similar movement of the series of dogs 70 associated with the flange 49 with respect to the series associated with the flange 50, to thus permit either series of the dogs 70 engaging or disengaging its associated flange independently of the other, as for example, when the vehicle leaves a straight course.

With the several elements comprising the modified form of my differential mechanism thus relatively disposed and their relative movements controlled as hereinbefore described, it will be obvious that should power be applied to the spider 60 to rotate the same, that such rotative movement will oscillate the dogs 70 out of radial alignment with respect to the axis of the spider 60 from the position shown in Figure 12 to the position shown in Figure 14 to thus cause the said dogs to engage their associated flanges and thereby communicate rotary motion to their associated coupler members and thence through the said members to the axles 27 and 28.

In this position the dogs 70 abut the forward ends of the slots 85 in the rings 79 and 80 as shown more clearly in Figure 14, the said dogs having reached the limit of their independent travel in a forward direction within the said slots 85 prior to engaging their associated flanges.

In Figure 13 I have shown the dogs 70 in an operative position, which position the mechanism assumes when the vehicle leaves a straight course. In the present instance the vehicle is assumed to be turning to the left, therefore the coupler member 45 with its associated axle and traction wheel being on the inside, continues to be driven by its associated dogs 70 and to revolve at the same speed as the spider 60, while, the coupler member 46 with its associated axle and traction wheel, being on the outside will overrun with respect to the spider 60, which overrunning of the coupler member 46 causes its associated dogs 70 to move or oscillate to a disengaging position as shown in Figure 13, to thus disengage the said dogs from the said coupler member 46 and permit the flange 50 of the member 46 to rotate freely in the slots 72 of the dogs 70.

To prevent the dogs 70 associated with the coupler member 46 from passing beyond their dead centers and engaging the flange 50 in a reverse direction, when the coupler member 46 overruns and disengages the said dogs from the flange 50 of the said members, the pins 93 disposed in the recesses 94 are adapted to contact with the forward side walls of the said recesses 94 as shown in Figures 13 and 14, thus utilizing the dogs 70 associated with and driving the coupler member 45 to regulate the oscillatory movement of the dogs 70 associated with the coupler member 46. Should conditions be reversed, as for example, should the member 45 overrun, its associated dogs will be similarly regulated by the dogs of the member 46.

During the overrunning of the coupler member 46, the frictional retarding ring 80 disposed within the said member continues to revolve at the same speed as the spider 60 for the reason that the rear end walls of the slots 85 in the ring 80 abut the rear sides of its associated dogs 70 as shown in Figure 13, thus causing the ring 80 to slip within the member 46.

When the vehicle again assumes a straight course the dogs 70 associated with the flange 50 of the member 46 again engage the said flange due to the slowing down of the member 46 to the speed of the spider 60.

In the modification shown in Figures 15 to 20 inclusive, I have adapted the elements comprising my differential mechanism for use with and disposition in the hubs of the traction wheels of a motor vehicle for the purpose of eliminating the excessive weight of the ordinary differential mechanism which is normally disposed in the center of the rear axles of motor vehicles and for obtaining the maximum of accessibility for the said mechanism.

The elements comprising this modification are slightly varied in their form of construction, but, the mode of operation of the same is substantially identical to that described for the construction shown in Figures 1 to 10.

Figures 15, 16, 17:
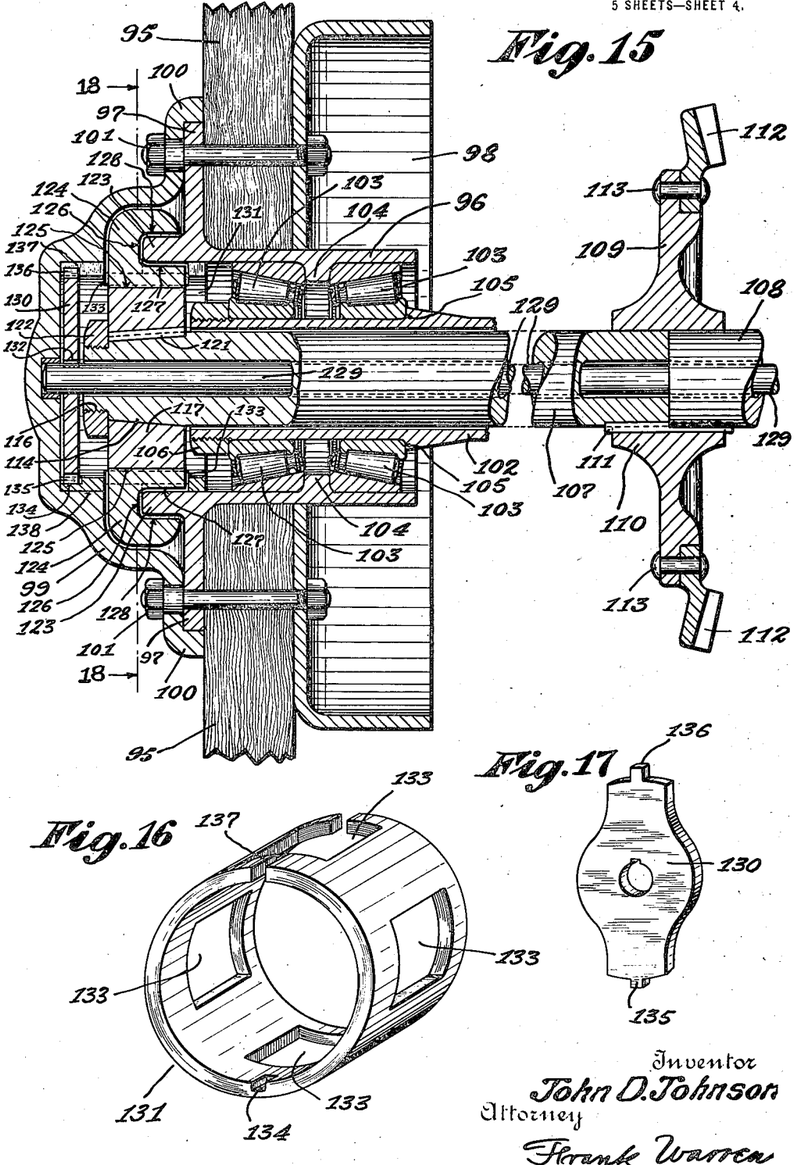
Figure 15 is a view substantially in vertical medial section of a modified form of my locking differential mechanism adapted to be disposed in the hubs of the driving or tractor wheels of a motor vehicle, parts being broken away and other parts being in elevation.
Figure 16 is a view in perspective of a frictional retarding spring ring adapted for use with the modified form shown in Figure 15.
Figure 17 is a view in perspective of a disc member adapted to be associated with and actuate the frictional retarding spring rings illustrated in Figures 4 and 16.

In Figure 15 I have shown one half of the modified differential mechanism disposed in the hub of its associated traction wheel, while the other half of the said mechanism which is of identical construction is disposed in the hub of the opposite wheel not shown. In view of the foregoing it is thought that the description of one-half will suffice.

The numeral 95 indicates the spokes of one of the traction wheels of the vehicle not shown, 96, indicates the sleeve or hub member of the wheel, having an integrally formed, outwardly projecting annular flange 97 disposed thereon adjacent its outer end.

The numeral 98 indicates the usual brake drum which is adapted to be mounted on the hub member 96 in spaced apart relation with respect to the flange 97, to thereby form an annular space in which the inner ends of the spokes 95 are adapted to seat as shown in Figure 15.

A hollow cover member 99 formed substantially in the shape shown is provided to enclose the differential mechanism disposed in the hub member 96, the said cover member 99 having an integrally formed annular flange 100 on the inner end thereof, adapted when operatively positioned to abut and encircle the flange 97 of the hub member 96 as shown.

Bolts 101 serve to positively secure the spokes 95 in the annular space formed by the flange 97 and the brake drum 98 and also serve to fixedly retain the cover member 99 in position, thereby maintaining the aforesaid elements in fixed relation with respect to each other.

The numeral 102 indicates the rear axle housing of the vehicle which is adapted to be attached to the said vehicle in any well known manner, the outer end of the said rear axle housing 102 being adapted to receive for rotation thereon the hub member 96.

To reduce the friction between the hub member 96 and the housing 102 I have interposed a plurality of roller bearings 103 which roller bearings are mounted on the housing and are disposed in spaced apart relation in the annular space formed by the hub member and the said housing. An annular internal shoulder 104 integrally formed on the hub member 96 serving to maintain the said bearings in spaced apart relation.

To prevent axial movement of the bearings 103 on the housing 102 and to positively secure the wheel to the said housing, I provided an integrally formed shoulder 105 on the housing adjacent the outer end thereof, the inner end of the inner bearing 103 being adapted to normally abut the said shoulder.

A threaded nut 106 is adapted to be threadably engaged on the outer end of the housing 102 and to normally abut the outer end of the outer bearing 103 to thus retain the wheel in rotative position on the outer end of the axle housing as will be readily understood.

Concentrically disposed for rotation within the axle housing 102 is the hollow rear axle shaft, which shaft is formed in halves 107 and 108 as shown the inner ends of the said halves being adapted to abut in the center of the vehicle.

The numeral 109 indicates a disc having a hub portion 110 which is adapted to be fixedly secured to the inner ends of the halves 107 and 108 of the axle shaft, as by a key 111, or in any other well known manner.

An annular bevel or master gear 112 is adapted to be fixedly secured to the circumferential portion of the disc 109 by rivets 113 substantially as shown, the said bevel gear 112 being adapted to normally mesh with the driving pinion of the propeller or driving shaft of the vehicle not shown.

The half 107 of the rear axle shaft is provided adjacent its outer end with a tapered portion 114 and on its outer end with a threaded portion 116.

Axially disposed on the tapered portion 114 of the half 107 of the rear axle shaft is a driving member 117, which driving member comprises a central portion 118 having a tapered bore 119 adapted to conform to and fit the tapered portion 114, and a plurality of outwardly projecting integrally formed substantially semi-cylindrical bearing surfaces 120 which are longitudinally and radially disposed on and with respect to the said central portion 118. The said driving member 117 when operatively positioned is adapted to be fixedly secured to the tapered portion 114 by a key 121 or in any other well known manner.

To positively insure against axial dislodgement of the driving member 117 on the tapered portion 114, I have provided a threaded nut 122 which is adapted to threadably engage the threaded portion 116 on the outer end of the half 107. The said nut being adapted when so positiond to abut the outer face of the member 117 as shown.

To establish a driving connection between the hub member 96 and the driving member 117 which driving member is positively driven through its fixed connection with the half 107 of the rear axle shaft, I have provided the said hub member 96 on its outer end with an integrally formed, outwardly projecting annular flange 123, which flange 123 is adapted to be operatively engaged by a plurality of clutching or gripping dogs 124 which are mounted for oscillatory movement on the bearing surfaces 120 of the driving member 117.

The gripping dogs 124 are recessed or grooved on their inner ends as at 125 to adapt them to fit over or journal on the aforementioned bearing surfaces 120, the said dogs are further provided on their inner sides thereof at a point adjacent their outer ends with transverse slots, 126, the inner walls 127 of which slots are convexly curved, while the outer walls 128 of the said slots are in the form of plane surfaces, but which may be formed in a convex manner if desired.

The walls 127 and 128 of the dogs 124 are adapted to normally fit over the flange 123 of the hub member 96 when the mechanism is assembled as shown in the drawings. To eliminate friction between the said walls and the said flange when the dogs are in a neutral or inoperative position, as for example during the overrunning of the said flange relative to the said dogs, I provide sufficient clearance between the said walls and the said dogs as more clearly illustrated in Figure 15.

To control the oscillatory movement of the dogs 124 on their associated bearing surfaces 120, and to cause the said dogs to engage and disengage the flange 123 at the proper time, I have provided suitable controlling mechanism comprising a shaft 129, a disc member, 130, and a split frictional retarding sleeve 131.

The shaft 129 is adapted to be axially disposed for independent rotation within the halves 107 and 108 of the hollow rear axle shaft hereinbefore mentioned, the ends of the shaft 129 when so disposed are adapted to be journaled in the hollow cover members 99 of the traction wheels as shown in Figure 15.

The disc member 130 is formed substantially in the shape shown in Figure 17, and is adapted to be fixedly secured to the shaft 129 adjacent to the end thereof by a key 132.

Figures 18, 19, 20:
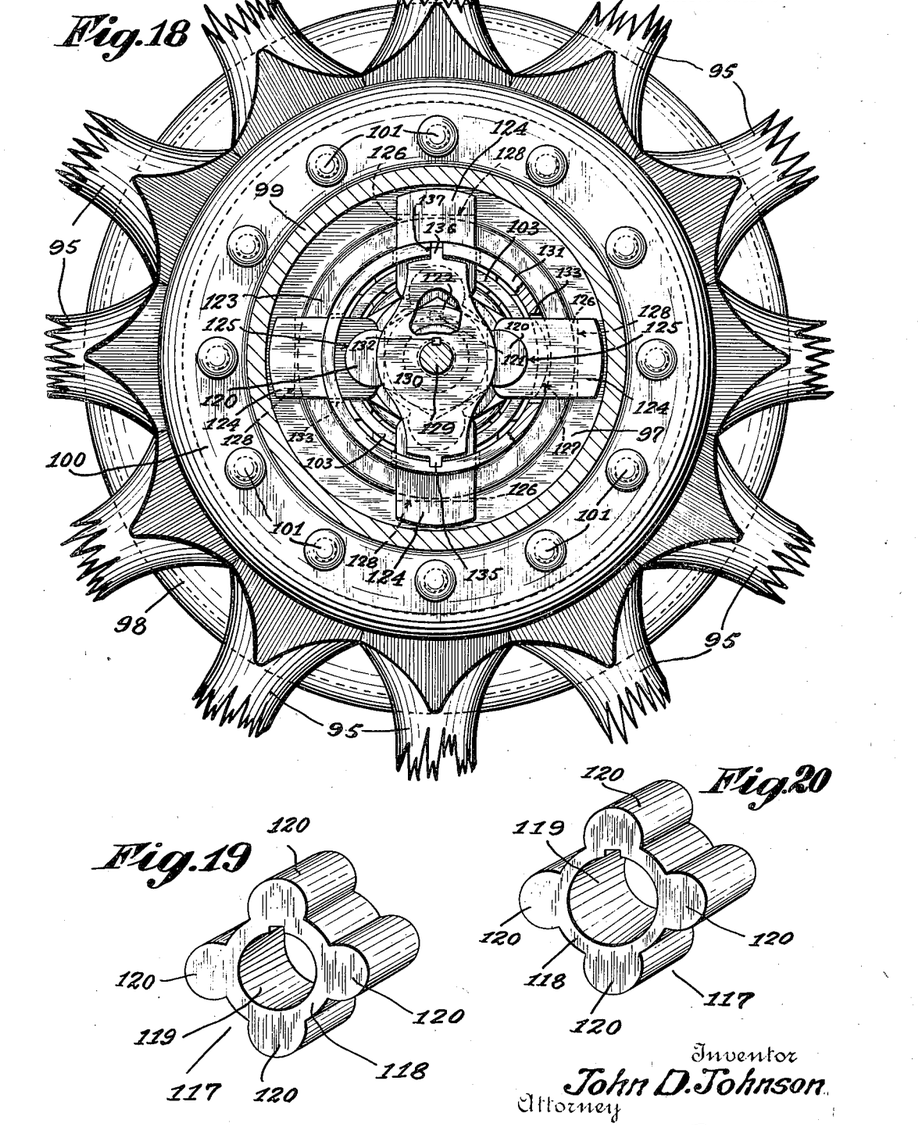
Figure 18 is a view in vertical transverse section taken on a broken line 18—18 of Figure 15 illustrating the mechanism in an inoperative position.
Figure 19 is a view in perspective of the central driving member adapted for use with the modified form illustrated in Figure 15.
Figure 20 is a similar view of the central driving member taken from the inner and opposite end thereof illustrating more clearly the tapering axial bore formed therein.

The split frictional retarding sleeve 131 is provided with a plurality of rectangular openings 133 which are equi-distantly spaced in the cylindrical walls as shown in Figures 16 and 18 and in which the dogs 124 are adapted to be operatively disposed for limited independent oscillatory movement in a forward or reverse direction with respect to the said sleeve as shown more clearly in Figure 18. The retarding sleeve 131 is further provided on its inner walls contiguous to its outer end with a keyway or groove 134 which is adapted to normally receive a tongue 135 formed integrally on the disc member 130, the other or oppositely disposed tongue 136 similarly formed on the disc member 130 being adapted to seat in the opening 137 formed by the splitting of the said sleeve.

The outer end of the retarding sleeve 131 is adapted to be concentrically disposed for independent rotary motion within an annular seat 138 formed in the hollow cover member 99, the said outer end being adapted for frictional engagement with the said annular seat. The inner end of the said retarding ring is adapted to be concentrically disposed for independent rotary motion within the outer end portion of the hub member 96, the said inner end being adapted to run freely at all times within the said outer end portion of the hub member 96.

With the several elements comprising this modified form of my differential mechanism thus relatively disposed and their relative movements controlled as hereinbefore described it will be obvious that should power be applied to the halves 107 and 108 of the rear axle shaft through the bevel gear 112 to rotate the said shaft, that such rotative movement will oscillate the dogs 124 journaled on the driving member 117 out of radial alignment with respect to the axis of the said member, to thus cause the dogs 124 to engage the flange 123 of the hub member 96, thereby communicating rotary motion to the said hub member.

When the vehicle is travelling in a forward direction, the dogs 124 abut the forward sides of the rectangular openings 133 formed in the retarding sleeve 131, the said openings 133 are formed of sufficient width to permit limited independent oscillation of the dogs 124 in either direction to thereby allow the said dogs to engage the flanges 123 subsequent to abutting the sides of the said openings when the vehicle is travelling in either a forward or reverse direction.

In the driving position described above with the dogs 124 engaging and driving the hub member 96 in a normally forward direction, the retarding sleeve 131 is also rotated in a forward direction at the same speed as the hub member 96 by the reason of the dogs 124 abutting the forward sides of the rectangular openings 133 in the said sleeve.

The disc member 130 being operatively connected with the retarding sleeve 131 also rotates with the said sleeve thereby rotating the shaft 129 to which the disc member is fixedly secured.

When the vehicle leaves a straight course thereby causing the outside traction wheel to over-run, the dogs associated with the said wheel will be disengaged from their associated flange, to permit the said flange to slip and rotate freely through the slots of the said dogs.

The retarding sleeve associated with the outside traction wheel by reason of its positive connection with the corresponding retarding sleeve on the inside traction wheel, thus continues to revolve at the same speed as the said inside wheel, thus slipping within the annular seat of its associated hollow cover member, and thus retaining the dogs associated with the retarding sleeve of the outside wheel in a neutral or inoperative position during the turning movement of the vehicle. The forward walls of the openings 133 of the retarding sleeve associated with the said outside wheel during the overrunning action of the said wheel are adapted to abut the forward sides of their associated dogs thereby retaining the said dogs in a neutral position.

When the vehicle again assumes a straight course the outside wheel will lay or slow down to the speed of the inside wheel at which time the dogs associated with the outside wheel will again engage with their associated flange by reason of the frictional engagement between the associated retarding sleeve of the said dogs and the annular seat of the said sleeve formed in its associated hollow cover member, which cover member being fixedly secured to the outside wheel lags with the said wheel thus causing the said retarding sleeve to lag slightly and throw the dogs over into engagement with their associated flange.

From the foregoing description taken in connection with the accompanying drawings, the advantages of the construction and of the method of operation of my locking differential mechanism will be readily apparent to those skilled in the art to which the invention relates, but, while I describe the principle of operation of the invention, together with the structure which I now consider to be the best embodiment thereof, I desire to have it understood that the locking differential mechanisms shown is merely illustrative and that such changes may be made when desired as are within the scope of the invention.

What I claim is:—

1. A locking differential mechanism comprising propelling means, driven members, annular flanges on the said driven members, gripping means extending between the said propelling means and the said annular flanges adapted to straddle the said flanges and to bind therewith during the rotary movement of the said propelling means to thereby impart rotary motion to the said driven members, frictional retarding means adapted to be operatively associated with the said gripping means, and means to permit the gripping means of one of the said annular flanges to control the action of the gripping means for the other of the said annular flanges.

2. A locking differential mechanism comprising propelling means, driven members, annular flanges on the said driven members adapted to overlie the said propelling means, gripping means extending between the said propelling means and the said annular flanges adapted to straddle the said flanges and adapted to bind therewith during the rotary movement of the said propelling means to thereby impart rotary motion to the said driven members, frictional retarding means for the said gripping means disposed in each of the said driven members, and means to positively connect the said frictional retarding means in each of the said driven members to thereby prevent independent action of the frictional retarding means associated with one driven member with respect to the frictional retarding means associated with the other driven member.

3. A locking differential mechanism comprising a housing, aligned horizontal bearings disposed therein, a casing concentrically disposed within the said housing and adapted to be journaled in the said bearings, power means carried by the said casing, coupler members journaled in the said casing, axle shafts having a driving connection with the said coupler members, a driving member disposed in the said casing adapted to be fixedly secured thereto and to rotate therewith, inwardly directed annular flanges carried by the said coupler members adapted to overlie the said driving member, and means extending between the said driving member and the said annular flanges adapted to straddle the said flanges and to bind therewith during the rotary movement of the said driving member to thereby impart rotary motion to the said coupler members, and controlling means for the said first named means.

4. A locking differential mechanism comprising a housing, aligned horizontal bearings concentrically disposed therein in spaced apart relation, a cylindrical casing concentrically disposed within the said housing having hubs journaled in the said bearings, power means carried by the said casing, coupler members disposed in the said casing having hubs journaled in the hubs of the said casing, axle shafts having a driving connection in the hubs of the said coupler members to rotate therewith, the inner ends of the said axle shafts being spaced, a driving member disposed within the said casing intermediate the adjacent ends of the said axle shafts, the said driving member being fixedly secured to the said casing and adapted to rotate therewith, inwardly directed annular flanges carried by the said coupler members adapted to overlie the said driving member and oppositely disposed dogs mounted for limited oscillatory movement on the said driving members, the said dogs having slots in their side faces which are adapted to receive the said annular flanges and to bind therewith during the rotary movement of the said driving member to thereby impart rotary motion to the said coupler members, and controlling means for the said dogs to permit either of the said flanges to travel faster than the other flange.

5. A locking differential mechanism comprising a housing, aligned horizontal bearings concentrically disposed therein in spaced apart relation, a cylindrical casing concentrically disposed within the said housing, outwardly directed axial hubs on the ends of the said casing adapted to be journaled in the said horizontal bearings, power means carried by the said casing, coupler members concentrically disposed in the said casing in spaced apart relation, outwardly directed axial hubs on the outer faces of the said coupler members adapted to journal in the axial hubs of the said casing; axle shafts having a driving connection with the said last named axial hubs, the inner ends of the said axle shafts being spaced, a driving member axially disposed within the said casing intermediate the adjacent ends of the said axle shafts, the said driving member being fixedly secured to the said casing and adapted to rotate therewith, inwardly directed annular flanges carried by the said coupler members adapted to overlie the said driving member, oppositely disposed gripping dogs operatively associated with the said driving member and with the inner and outer faces of the flange of each of the said coupler members, and mechanism associated with the said driving member, the said coupler members, and the said gripping dogs of the flange of each of the said coupler members whereby the said gripping dogs may be actuated in response to the rotative movement of the said driving member.

6. A locking differential mechanism comprising a housing, aligned horizontal bearings concentrically disposed therein in spaced apart relation, a cylindrical casing concentrically disposed within the said housing, outwardly directed axial hubs on the ends of the said casing adapted to be journaled in the said horizontal bearings, power means carried by the said casing, coupler members concentrically disposed in the said casing in spaced apart relation, outwardly directed axial hubs on the outer faces of the said coupler members adapted to journal in the axial hubs of the said casing; axle shafts having a driving connection with the said last named axial hubs, the inner ends of the said axle shafts being spaced, a driving member axially disposed within the said casing intermediate the adjacent ends of the said axle shafts, the said driving member being fixedly secured to the said casing and adapted to rotate therewith, inwardly directed annular flanges carried by the said coupler members adapted to overlie the said driving members, a plurality of oppositely disposed gripping dogs mounted for limited oscillatory movement on the said driving member, the said dogs having slots in their side faces which are adapted to receive the said annular flanges and to bind therewith during the rotary movement of the said driving member to thereby impart rotary motion to the said coupler members, frictional retarding means disposed in each of the said coupler members and adapted to operatively engage the said dogs during the rotary movement of the said driving member and controlling means for the said dogs to permit the dogs associated with the flange of one coupler member limiting the oscillatory movement of the dogs associated with the flange of the other coupler member during the over-running of one of the said coupler members with respect to the other coupler member.

7. A locking differential mechanism comprising a housing provided with two journal bearings disposed in opposite ends thereof in axial alignment with each other and further provided with a shaft bearing in one of its sides thereof which bearing is disposed with its axis perpendicular to the axis of the said two journal bearings; a cylindrical casing concentrically disposed within the said housing and provided with outwardly directed axial hubs on the ends thereof that are adapted to be journaled within the said two journal bearings, the said hubs being provided with concentrically disposed holes extending therethrough, a gear wheel mounted on the said casing adapted to rotate the same, a driving pinion gear adapted to mesh with the said gear wheel, a propelling shaft having its rear end journaled in the said shaft bearing and having a driving connection with the said driving pinion; two coupler members each provided with a hub that projects from one side thereof and with an integral annular flange that projects from the other side thereof, each of which coupler members are concentrically disposed within the said casing with its hub rotatably disposed within the concentric hole of a different one of the hubs of the said casing, and the hub of each of the said coupler members being provided with a concentrically disposed hole extending therethrough; two shafts disposed each with its inner end portion projecting within the hole in the hub of a different one of the said coupler members, each of the said shafts being adapted to be rotated in response to the rotative movements of its associated coupler member; a driving member provided with a plurality of radial arms, the outer ends of which are adapted to be fixedly secured to the cylindrical walls of the said casing, the said driving member being further provided with a plurality of semi-cylindrical surfaces radially disposed thereon, and having a concentrically disposed hole extending therethrough; a plurality of oppositely disposed gripping dogs mounted for limited oscillatory movement on the said semi-cylindrical surfaces, the said dogs having slots in their side faces which are adapted to receive the annular flange of their associated coupler members and to bind therewith during the rotary movement of the said driving member to thereby impart rotary motion to their associated coupler members; a separate split frictional retarding ring concentrically disposed and seated in each of the said coupler members, which rings are provided with a plurality of radial slots within which the gripping dogs are normally disposed, the said rings are further provided with a plurality of grooves formed in the inner walls thereof, a sleeve member axially disposed in the said concentric hole in the said driving member having its ends project outwardly from the sides of the said driving member; and a disc member adapted to be fixedly secured to each of the projecting ends of the said sleeve member, the said disc members being provided with tongues adapted to seat in the said grooves formed in the said retarding rings.

In witness whereof, I hereunto subscribe my name this 15th day of September A. D. 1920.

JOHN D. JOHNSON.